INVENTOR.
Jeffie I. Wykert

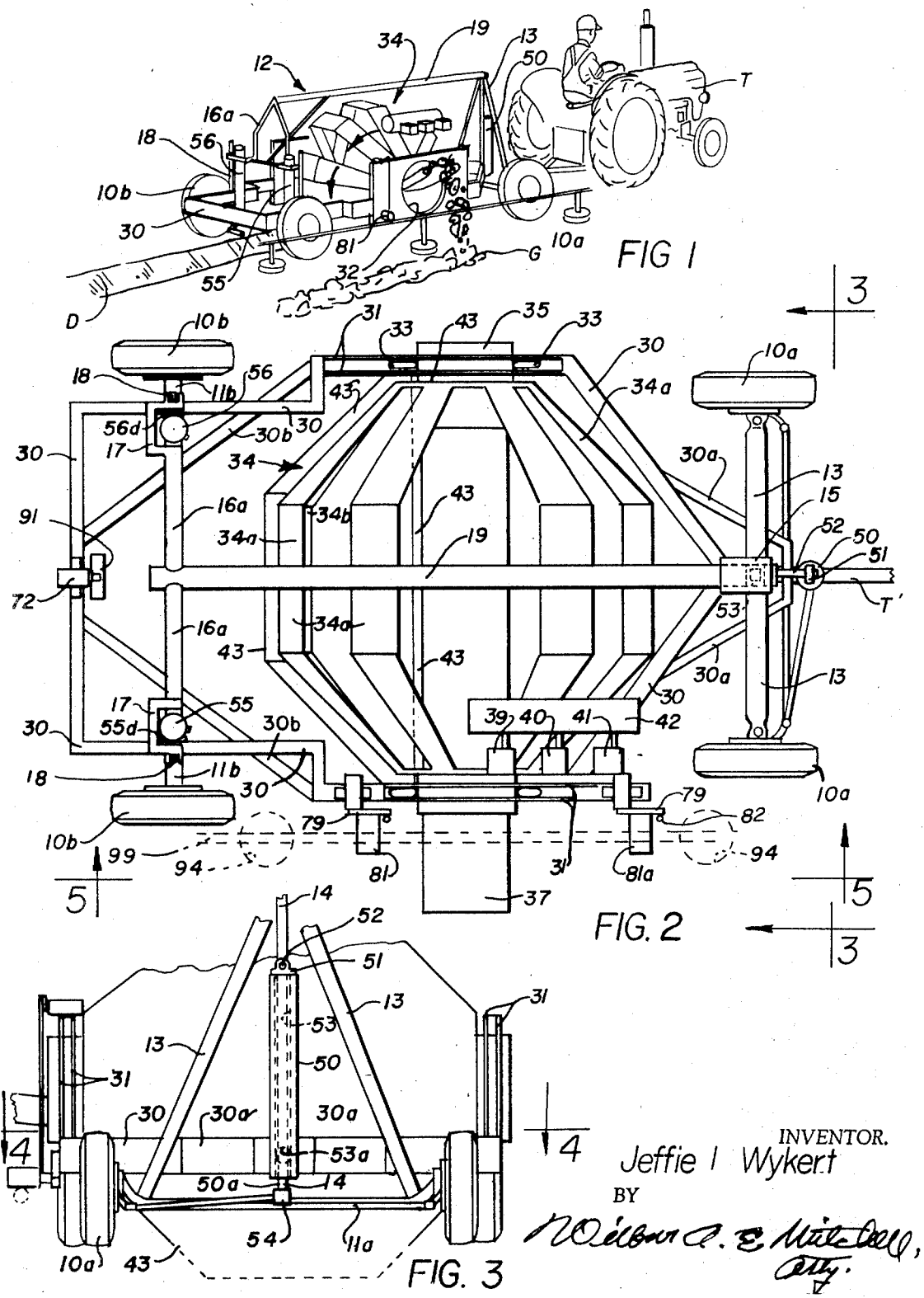

June 23, 1970          J. I. WYKERT          3,516,182

SELF-LEVELLING IRRIGATION DITCHER MACHINE

Filed Dec. 6, 1967          5 Sheets-Sheet 3

INVENTOR.
Jeffie I. Wykert

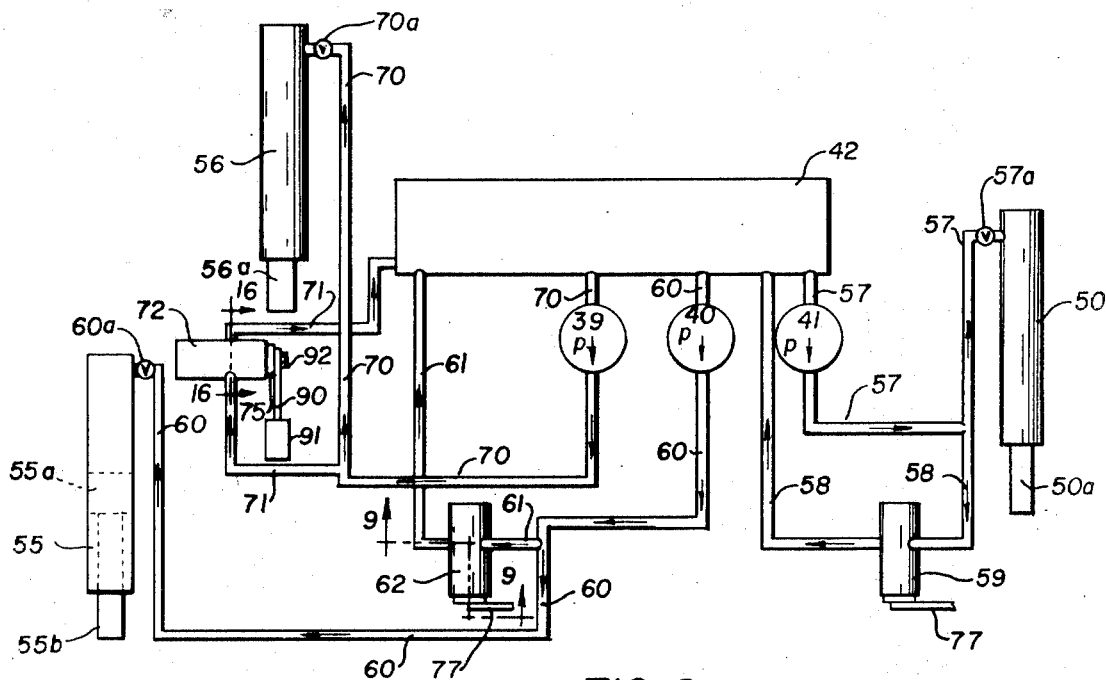

June 23, 1970     J. I. WYKERT     3,516,182
SELF-LEVELLING IRRIGATION DITCHER MACHINE Filed Dec. 6, 1967     5 Sheets-Sheet 5

INVENTOR.
Jeffie I. Wykert
BY 3,516,182
SELF-LEVELLING IRRIGATION DITCHER
MACHINE
Jeffie I. Wykert, 304 S. First Ave., Ault, Colo. 80610
Filed Dec. 6, 1967, Ser. No. 688,595
Int. Cl. E02f 5/08
U.S. Cl. 37—97                                          4 Claims

ABSTRACT OF THE DISCLOSURE

A ditcher for forming irrigation ditches comprising a digging wheel mounted on a towed chassis. An automatic levelling system is provided to maintain the digging wheel axis in a horizontal position on uneven terrain. The automatic levelling system comprises both a grade wire and feeler device as well as a pendulum device for sensing uneven terrain and levelling the digging wheel.

In irrigated farming areas, it is to be borne in mind that application of water to irrigate crops growing in a field necessitates certain usual and customary steps in the preparation of that field for such irrigation. Namely, in a so-called dry land field to be adaptable to be irrigated, by water in ditches, taken either from a natural source, such as a stream or a main ditch lateral, or taken from an irrigation well, it is first necessary to establish a proper state of so-called levelling or grading of the surface of that field, usually by heavy land levelling machinery, so as to adapt that surface to permit water thereon to run by gravity downhill in a given predetermined direction from the main water source for the field. It is after such a levelling of a field that my machine is then used, namely, in the preparation and installation of the necessary outer field irrigation ditches usually around the periphery of the field or at one or more sides thereof; and the installation of such ditches usually have to be installed on a uniform slightly down-grade line.

It is to be further borne in mind, from time to time, that water and erosion cause these small field irrigation ditches to become filled and out of repair, as well as the entire surface of an irrigated field becoming uneven or out of repair and that periodical repair of both the field and the ditches is required to maintain them at a proper state of being substantially on an even or level line or grade. In modern irrigated farming these small outer field ditches are now sometimes lined with concrete, which greatly lengthens their usable life and efficiency. In fact, my ditcher machine may be used in the preparation of such small field ditches to establish them of the proper degree of uniformity on a given grade line in preparation for the concreting process in the newly formed ditch.

The mentioned land levelling of an entire field in preparation for said irrigation thereof, by heavy land levelling digging and grading machinery, usually substantially establishes a given degree of straight line down grade uniform surfacing of the field, but it is to be understood that that is never a perfect surface line and that the surfacing in any given direction varies several inches, or for as much as 4 or more inches throughout the length of the field. It is for the latter reason that I have developed a machine which is capable of forming the desired irrigation ditch for a field automatically on a straight level or down-grade line as may be the desired case as the machine is propelled forwardly, despite the wheels of my machine raising and lowering a matter of said 4 or more inches while riding on the contour surface of the field, as just explained.

In view of the foregoing explanation, a principal object of my invention is to provide a digger machine adapted to be propelled along the edge of such a field to automatically dig the needed grade irrigation newly dug ditch with the ditch bottom formed in the desired constant grade line despite the substantially uneven contour of the surface of the ground.

More specifically, it is a principal object of my invention to provide a paddle wheel irrigation ditch digger machine, which is adapted to automatically dig the ditch at a desired straight line depth as it is moved forwardly, having a plurality of pivotal hydraulic actuated suspension means each adapted for vertically adjustably holding a part of the digger wheel unit of the machine, together with a means for automatically controlling the vertical holding position of each of said hydraulic holding means, with relation to the chassis frame of the entire machine and in proportion to the rise and fall contour of the surface of the ground over which the machine is propelled, for the digging of a straight uniform line depth ditch despite variations in that surface contour of the land.

Another object of my invention is the provision of a novel operable hydraulic rotary sleeve pressure release valve, in the hydraulic line between the source of hydraulic pumped liquid and the interior of a vertical hydraulic ram-cylinder holding means, for adjustably vertically holding a part of the digger unit to the chassis of the machine, and which valve is automatically operably adjusted, upon the rise or fall of the chassis frame of the machine as a wheel thereof rides over uneven ground, by the valve being pivotally operably controlled by a master shoe riding on a pre-determined grade control pipe guide resting on the ground for varying the amount of the hydraulic pressure held by said ram-cylinder.

Another principal object of my invention is the provision of such an irrigation ditch digger machine having a cage frame chassis with wheels, a digger unit frame pivotally suspended within said chassis by individual vertical hydraulic ram-cylinder units, with the cylinder of each ram unit being attached to the digger unit frame and with the piston rod of each ram unit being secured directly to a part of the chassis framework, the digger unit comprising a paddle wheel digger scoop combination operable to dig the ditch as the machine is pulled forward and to deposit the dug earth onto a transverse conveyor belt extending beyond the side of the newly formed ditch, each of said vertical ram-cylinders being hydraulically vertically raisably operable by hydraulic pressure from a suitable hydraulic supply and pump source on the machine, a stationary pre-determined straight guide pipe along the side of the machine and pre-determining the grade line for the digging of the new ditch, a rotary operable-core sleeve relief valve in the hydraulic line between the hydraulic pump source of fluid and a ram-cylinder for controlling the amount of the hydraulic pressure at all times to be within the hydraulic ram-cylinder on operation of the machine and in proportion to the rotation of the core of the valve, and said rotatable core of said valve being operably controlled by a guide-shoe pivot arm riding upon said fixed guide grade pipe line, and with a connecting arm between said guide-shoe and said valve core having an adjustable link therein.

Another object of my invention is the provision of such a novel operable rotary sleeve-core hydraulic-release valve, positioned in the hydraulic line between a hydraulic source of power and the internal end of such a vertical hydraulic ram-cylinder, having its cylinder fixed to the digger unit frame and its piston rod fixed to the chassis axle of the machine, with the sleeve of said valve being horizontally fixedly positioned on the digger unit frame and with a weighted pendulum radial crank arm fixedly secured axially to the rotatable inner core of said valve for effecting an automatic rotation of said core by a gravity operation of the pendulum upon a variation from the horizontal position of the digger unit frame.

Other and further objects of my invention will be apparent to those skilled in the art from the following detailed drawings in which:

FIG. 1 is a reduced elevational view illustrating my novel digger machine in the operation of digging a desired small ditch as the machine is being towed by a tractor;

FIG. 2 is a plan view of my machine;

FIG. 3 is a front end partial view thereof;

FIG. 8 is a diagrammatic view of my novel three-point hydraulic ram-cylinder suspension means, of pivotally holding and independently elevatingly operating my digger unit within the cage chassis unit, including my novel automatically operable hydraulic system of rotary sleeve valves 59, 62, and 72;

FIG. 9 is an enlarged cross-section view of one of my novel operable hydraulic rotary sleeve release valves 62, taken on the irregular line 9—9 of FIG. 8;

FIG. 10 is a partial vertical sectional view of said hydraulic operable rotary sleeve release valve shown in FIG. 9 and taken on the line 10—10 of FIG. 9;

FIG. 16 is a vertical cross-sectional view of the pendulum actuated rotary sleeve release valve 72, taken substantially on the line 16 of FIG. 8;

Throughout the drawings like reference characters have been used to designate like or similar parts for illustrative purposes.

Figure 4:
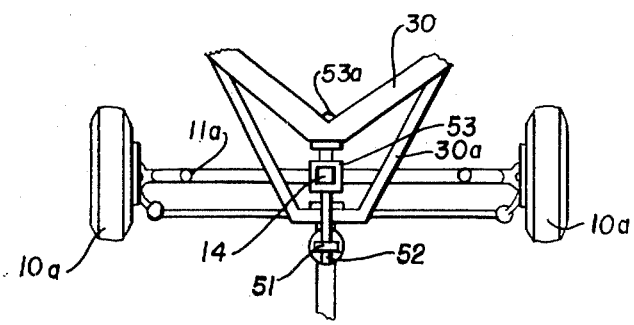
FIG. 4 is a partial horizontal sectional view of the portion of the front end thereof taken on the lines 4—4 of FIG. 3.

I provide a novel cage-frame chassis indicated generally as 12, having a front axle 11a, of the conventional automobile type, with front wheels 10a, and with a tow bar T conventionally extending forwardly from the front axle and the front wheel tie rod. The rear axle is indicated at 11b and has a pair of rear wheels 10b thereon. At the front I provide an inverted V brace 13, extending upwardly from the front axle to an apex pivot-collar point 15. Another inverted V-like brace 16a, extends upwardly also to a point from the rear axle, by a pair of vertical extension rods, 18. Between the center of the front axle and the upper apex point 15, I mount a vertical solid square rod 14, to reinforce the braces 13. The rear V-inverted brace 16a is of the configuration illustrated in FIG. 7 and has a pair of off-set horizontal notches 17 formed therein, as shown in FIG. 2, to provide a suitable space through which the up-right ram-cylinders, 55 and 56, extend without being attached thereto. To complete the cage over-head frame, I secure a rigid front to back chassis frame bar, solidly at 19 at its junction with the apex of the rear chassis frame 16a, but with 19 being pivotally secured at collar point 15 connection at the top of the front inverted V-chassis frame 13. I provide a chassis rear horizontal cross-brace 20, extending between the horizontal notches 17 of the rear up-right frame portions 16a, and a forward angular brace 21, from cross brace 20 to cross bar 19, and also an X frame brace indicated as 22, as shown, between the cross brace 20 and the rear axle 11b.

Figure 5:
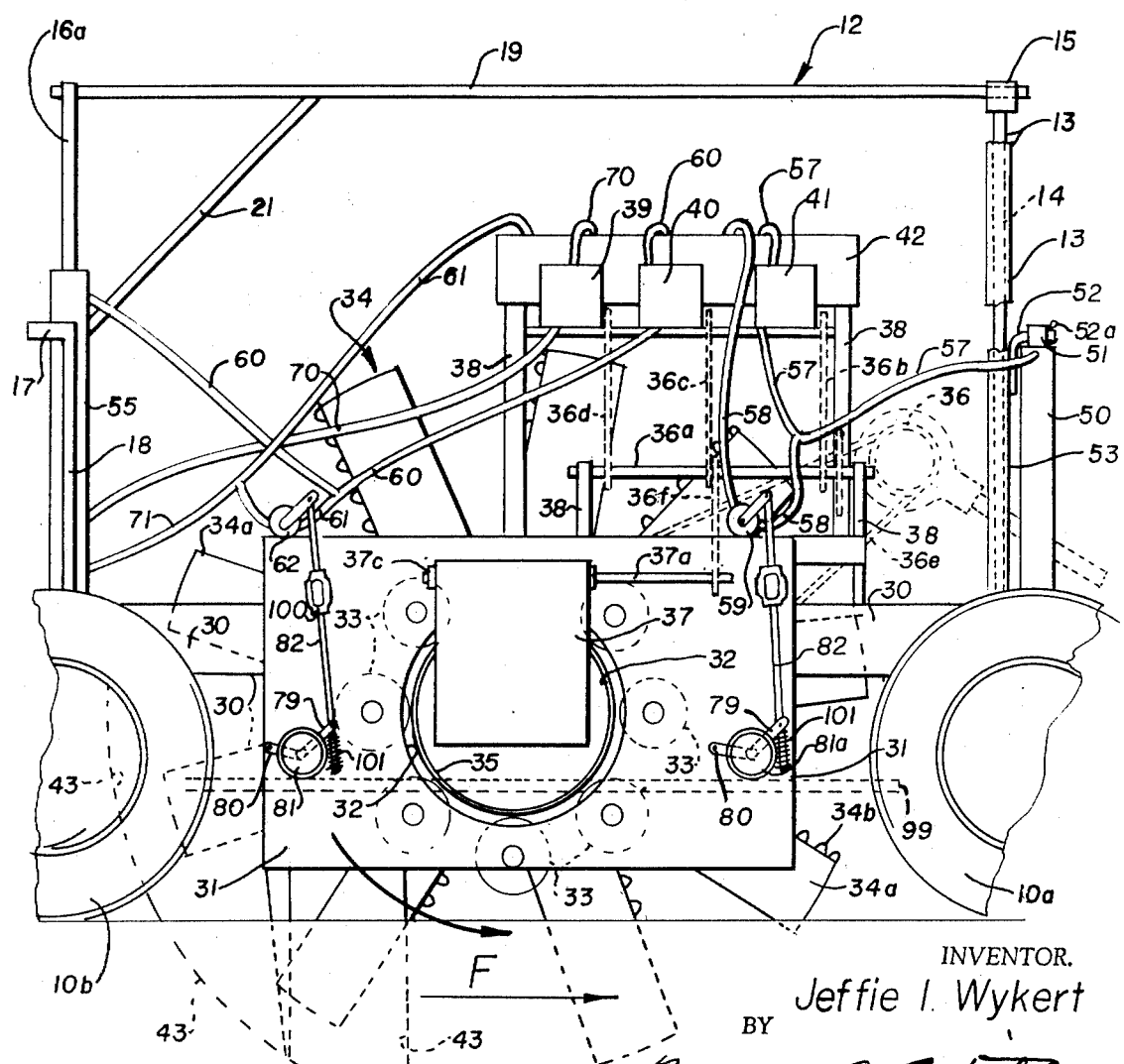
FIG. 5 is a partial view taken from the right side of the machine as indicated in FIG. 2.

Within that just explained cage-chassis 12, I pivotally suspend my rotary paddle wheel ditcher unit 34, by a a three-point suspension by means of three separate hydraulic vertical ram-cylinders, 50, 55 and 56. I provide a separate frame 30 for my said digger unit, so pivotally mounted by a three-point suspension within my novel cage chassis 12. My digger unit frame 30 is of solid or I-beam horizontal construction, except for a gap therein on each side of that frame, where I provide rigid parallel pairs of aligned spaced like vertical plates 31, by welding same across said gap, as shown. Frame 30 has a small horizontal front wedge extension, indicated as 30a. To strengthen that horizontal frame 30, as shown, I provide rear angular corner horizontal braces 30b thereon as will be noted in FIG. 2. Each of the like size and positioned pairs of plates 31 has a horizontally aligned relatively large round opening, 32, formed therein and with the opening of each pair being in alignment with the identical openings of the other pair thereof. Within said openings 32, I suitably journal the axle 35, of my novel paddle digger wheel indicated as 34, on a horizontal axis. As an axle 35, I provide an end-to-end aligned pair of hollow-drum-like collars 35. My said digger wheel is of the squirrel-cage-like configuration shown, having a plurality of radial digger scoop arms 34a extending from the peripheries of collars 35 thereof in spaced relationship to each other, as indicated. Each blade 34 has teeth 34b extending from the outer or cutting edge thereof as the paddle wheel rotates. I construct that digger paddle wheel by welding those radial scoop arms to said relatively large pair of aligned cylindrical hollow round drum-like collars 35, and design those drums to be the axle for the digger wheel 34. Collars 35 are each slightly less outside diameter than the inside diameter of the aligned openings 32. I journal that drum axle by having each collar 35 within and beyond the sides of each pair of the aligned openings 32, of each pair of side steel plates 31, as shown. As a means for so journaling said axle 35 of the wheel 34 within said openings 32, of each pair of plates 31, I provide a set of small roller wheels, each indicated as 33, and each suitably pivotally mounted between a pair of the plates 31 in formation so that the peripheries of a set of the wheels 33, between a pair of the plates 31, are in alignment slightly extending circularly within the opening of those plates so as together to comprise a journal to act as rollers to abut the outer peripheries of the said adjacent axle collar 35 of the paddle wheel, extending through those openings for a suitable free-rotatable journalling of that paddle wheel thereby within that opening 32 of the digger unit frame. I provide a conventional differential-type power take-off 36, from the tractor T, by a suitable drive belt chain 36e and a chain cog wheel on the exterior of the collar-pair-drum 35, in conventional manner, to cause a rotation of the paddle wheel downwardly and forwardly, or counterclockwise as the machine is towed forwardly or to the right as illustrated in FIG. 5. My paddle wheel 34, with its digger arms 34a, are substantially of the design and proportion and construction as shown. To assist in the digging and cleaning of the desired irrigation ditch by the paddle arms 34a of that digger wheel 34, upon operation of the machine, I provide a dirt scoop 43 of substantially solid-vertical-half-cup-configuration and with its upper half circular peripheral edge being firmly secured to and carried by the frame 30 of the digger unit so that it hangs downwardly therefrom, as illustrated in FIG. 5. The scoop 43 is designed to follow snugly within the newly dug ditch, as formed by the paddle wheel blades 34, for the purpose of scooping up any loosely dug dirt as may remain in that newly dug ditch and thereby scoop-collecting that loose dirt therein and dragging that loose dirt along thereby as the machine moves forwardly for the purpose of the continued counterclockwise rotation of that paddle wheel 34 continuing to scoop the loose dirt therefrom and raising that dirt upwardly, until substantially at the central vertical point in the rotation of the paddle wheel where then that dirt falls down onto a conventional endless dirt conveyor belt 37, positioned within the opening in the interior of the axle collars 35 of the wheel 34. The dirt conveyor belt 37 is suitably mounted on and over pulley wheels 37b, not shown, at the left side of the machine within the adjacent opening 32, and over another pulley belt wheel 37c, suitably mounted on a rotating stub shaft 37a, which in turn is suitably mounted, as shown, to the outer side plate 31 on the right side of the machine adjacent to the edge of the adjacent opening 32. It is to be understood that each digger wheel radial blade, 34a, is of an internal bucket like scoop construction so that with each revolution thereof an amount of dirt is not only dug thereby but picked up and carried thereby for a counterclockwise one-half turn revolution until, at the upper vertical point on each rotation, the dirt falls by gravity therefrom onto the conveyor belt 37 therebelow, in conventional manner.

Secured to the top of the right hand pair of plates 31, I provide a rigid frame extension structure, indicated generally as 38, upon which I mount a suitably journalled rotable power transmission shaft 36a, a hydraulic reservoir 42, and three hydraulic power pumps, 39, 40 and 41. Conventional chain sprockets are suitably keyed to the rotatable shaft 36a. That shaft is also provided with suitable chain drive gear, for transmitting power to run the rotatable drive shaft 37a, to operate the endless dirt conveyor 37. Each of said hydraulic pumps 41, 40 and 39 are operated by a conventional drive chain, taking power from the stub shaft 36a, by conventional endless drive chains indicated as 36b, 36c, and 36d, respectively. The stub shaft 36a is driven by suitable conventional chain drive connection with the source of power taken from the differential 36, though not shown.

I mount the digger paddle wheel unit 34, by its frame 30, by a three-point pivot suspension to and vertically adjustable within the cage chassis 12, by three vertical hydraulic ram-cylinders 50, 55 and 56. Hydraulic ram-cylinder 50 is at the front of my machine, and is a part of the single pivotal front connection between the digger unit and the chassis frame. As viewed in FIGS. 5 and 6, I slideably mount a square tubular elongated member 53, on and over the vertical center reinforcing shaft 14, before the mounting of that shaft in place as indicated. The lower front and back opposing sides of that elongated tubular member 53, are suitably pivotally journalled as indicated, at points 53a, to the spaced apart portions of the apex of the horizontal front wedge 30a of the main frame 30, to permit that main frame to rock laterally on that pivot 53a. Square tube 53 is adapted to slide vertically on and with relation to the vertical square center rod 14. At the forward top outside of square tube 53, I suitably weld a forward and upward extending arc hook 52. That hook arm extends through a collar strap member 51, with 51 secured to the upper closed end of the ram-cylinder 50. A cotter key 52a is conventionally secured through the end of 52 to hold the journal strap 51 thereon. Front hydraulic ram-cylinder 50 is of conventional construction, having a piston 50b therein and a piston rod 50a extending downwardly therefrom. A rigid stud arm extension 54 extends forwardly from the lower end of vertical support rod 14 attached to the front axle. Parts 14, 52, 53 and 54 could be eliminated in smaller machines and the ram-cylinder 50 placed directly between the front axle and the point 15, and with the frame 30–30a pivot connection 53a through the casing only of that cylinder, in such event. As shown, the lower end of the poston rod 50a, of front ram-cylinder 50, is secured to the end of that arm 54, as indicated at 54a.

Figures 6, 7:
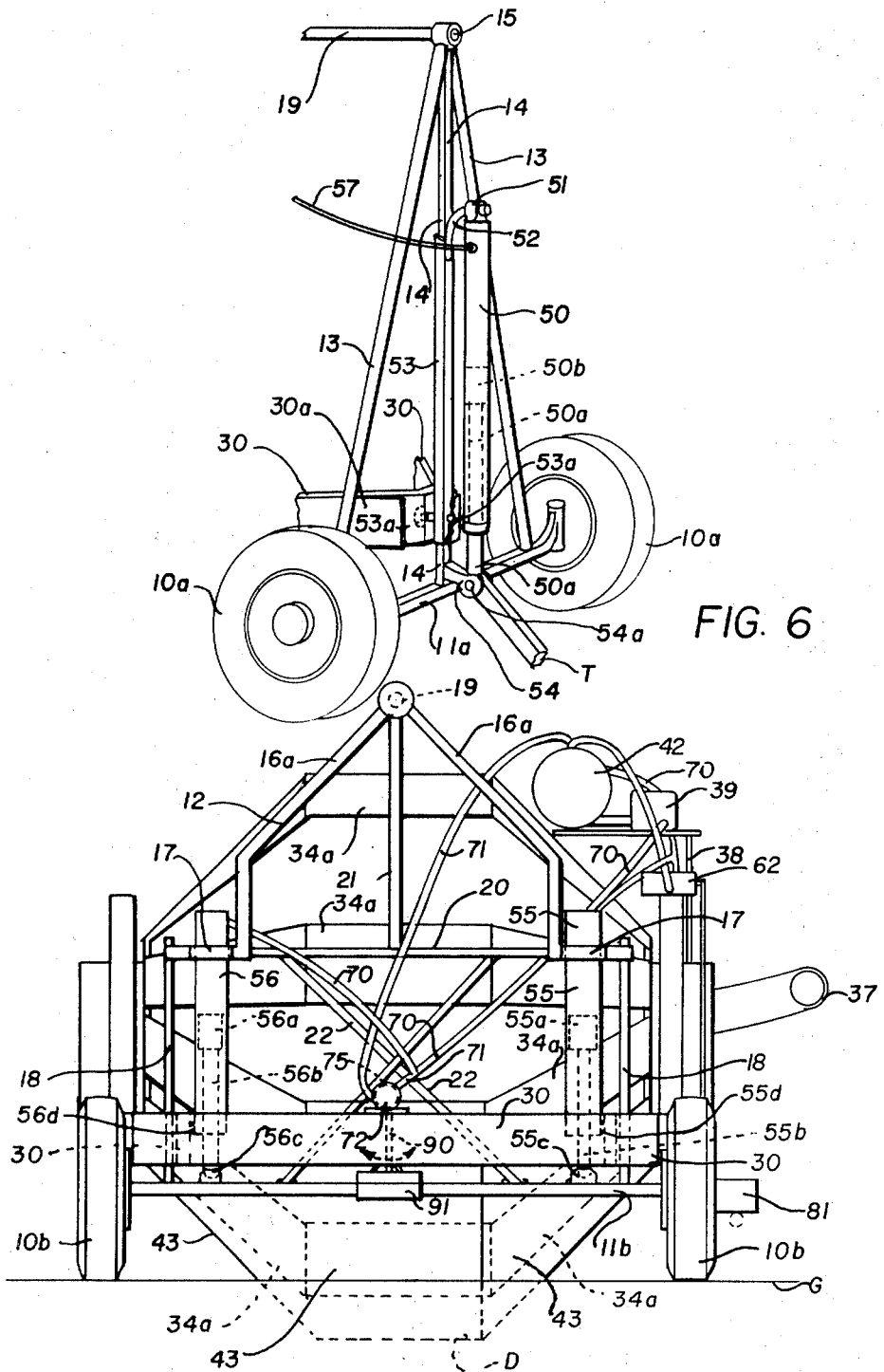
FIG. 6 is a partial perspective vertical view of the front end of my machine.
FIG. 7 is a rear end view of my machine.

Another pivotal connection mounting of my digger unit within and to the cage chassis frame 12, is accomplished by means of another vertical hydraulic ram-cylinder 55, at the right rear corner of the machine. That ram-cylinder has its cylinder exterior suitably fixedly welded to the digger frame 30, at point indicated as 55d, as shown in FIGS. 2 and 7. This hydraulic ram-cylinder 55 is also of conventional construction, with a piston 55a therein and a piston rod 55b extending downwardly therefrom and with the lower end of the piston rod 55b being suitably pivotally resting on and secured within a pivot cup 55c welded onto the rear axle under that cylinder 55.

The third pivot point connection mounting between my novel digger unit and said cage chassis frame 12, is also accomplished by means of another vertical hydraulic ram-cylinder, indicated as 56, at the left rear corner of my machine. The outer cylinder of said hydraulic ram-cylinder 56 is suitably fixedly welded to the digger frame 30 at point 56d. That hydraulic ram-cylinder 56 is likewise of conventional construction, having a piston 56a therein and a piston rod 56b extending downwardly therefrom. The lower end of that piston rod 56b is pivotally secured to the rear axle 11b by the lower end of that rod setting on and secured within a suitable pivot cup joint indicated as 56c and which cup is welded to the rear axle 11b under that cylinder 56.

It will be seen that I have provided three pivot points of connection for my inner paddle wheel digger unit 34, by its frame 30 to and within the outer cage frame 12, namely: at pivot point 53a, of FIG. 6, carried through the members 53–54–50–50b–50a–14–11a and 13; at the right rear hydraulic ram-cylinder 55 welded to the digger unit frame 30 at 55d, and the piston rod 55b of that cylinder pivoted in the socket 55c on the rear axle 11b, as the second point; and at the left rear hydraulic ram-cylinder 56 welded to the digger frame 30 at point 56d, and the piston rod 56b pivoted within the socket 56c, in turn welded to the rear axle of the cage chassis. It will be seen that each of those three pivot points of suspension just mentioned are each separately elevatable by hydraulic power individual operation of each of those individually hydraulic digger-unit-carrying cylinders, 50, 55, and 56.

I vertically and independently operate each of said vertical hydraulic ram-cylinders 50, 55 and 56, by means of increasing or decreasing the hydraulic pressure within the respective chamber portions of each of those hydraulic ram-cylinders, or between the respective piston thereof and its respective closed-in head of each cylinder. By viewing FIGS. 6 and 7, it will be seen that upon such an expansible or contraction movement of a piston within or with relation to its ram-cylinder head that an effective raising or lowering of that portion of the frame 30 secured to the adjacent cylinder is accomplished respectively thereby, thus the inner digger unit of my machine, at the respective one of said three points of suspension thereof, is thereby individually and independently raised or lowered, by its frame portion, as the case may be.

To accomplish such vertical operation of those hydraulic ram-cylinders I provide a conventional hydraulic power pressure system, mounted on the digger unit frame extension 38, comprising a hydraulic reservoir 42, filled with suitable hydraulic liquid, a suitable power-steering-type hydraulic pump for each cylinder, with the pumps indicated as 39, 40, 41 and an individual set of hydraulic pipe connections between said hydraulic reservoir 42 and each of said ram-cylinders 50, 55 and 56, and with each of said pipe connection having a hydraulic pump in the line thereof. Referring to diagrammatic FIG. 8 in the drawings, I connect the top internal head of the front ram-cylinder 50 with the hydraulic reservoir 42 by a suitable pipe connection 57. A manually operable hand shut-off valve 57a is provided in that line and is normally kept open, for reasons to be explained. I provide an off-set relief pipe line 58, from that pipe line 57, back to the reservoir 42, and in that off-set line 58, I place one of my novel operable rotary sleeve release valves 59, and which valve 59 is automatically operable upon the use of my machine, as will be explained. I connect the internal chamber of my right rear vertical ram-cylinder 55 by a suitable pipe line connection 60 with the hydraulic reservoir 42. In that line 60 I have a suitable manual hand shut-off valve 60a, but which is normally kept open for reasons to be explained. I provide an off-set pipe line 61, from the pipe line 60 back to the reservoir 42, and with another of my novel operable rotary sleeve release valves, indicated as 62, in that line 61, and which valve 62 is automatically operable during the operation of my machine, as will be explained. Valves 59 and 62 are of identical construction and operation. I provide a direct pipe line connection 70 between the reservoir and the internal chamber of the vertical left rear ram-cylinder 56. A manual hand shut-off valve 70a is in that line but is normally open for reason to be explained. I provide an off-set relief pipe line 71, from that pipe line 70 back to the reservoir 42, with one of my novel operable rotary sleeve release valves, indicated as 72, in the line 71. This valve 72 is of internal identical construction to the other rotary sleeve valves, 59 and 62, but is operated automatically differently than valves 59 and 62, in that valve 72 is a gravity pendulum rotary operable valve, as will be explained.

I provide a novel operable pressure release valve combination in each of the hydraulic pressure lines from pumps 39, 40, and 41 to their respective cylinder chambers of the vertical hydraulic ram-cylinders, 56, 55 and 50.

It will be noted that the vertical ram-cylinder 50 is at the front end of the machine and as a result of the attachment of 50 just explained that the operation of 50 effects a raising or lowering of the frame 30 front end of the machine on the pivot 53a, by causing a slideable raising or lowering, respectively, of the square tubular member 53 on the square vertical rod 14; and it will be noted that the operation of vertical ram-cylinder 55, as a result of its just explained attachment, effects a raising or lowering of the right rear corner of the frame 30 on the right rear axle 11b; and it will be noted that the operation of left rear vertical ram-cylinder 56, as a result of its attachment just explained, effects a raising or lowering of the left rear corner of the digger unit frame 30 on and with relation to the left portion of the rear axle.

My said novel automatically operable pressure release valves, 59, 62 and 56 each have an exterior round cylindrical sleeve 73, securely bolted in a horizontal position to the frame 30, conventionally as by bracket and stud bolts 74. Each valve has a round snugly fitting rotatable solid inner valve core 75, rotatably inserted and operably held within the sleeve 73, except that there is one diametrical hole 76 extending completely through the valve core 75, as illustrated. The core opening 76 is positioned so that on core rotation it will be aligned to become an extension between diametrically opposed inlet and outlet openings 76a and 76b formed in the sleeve 73; those inlet and outlet openings of the sleeve 73 have conventional pipe extensions threaded therein, as by pipes 61 in FIG. 9. As illustrated in FIG. 9, a rotation of the inner core 75 of the valves will align or disalign the core opening 76 with the openings 76a and 76b and the main hydraulic pipe line 61, obviously for permitting or restricting hydraulic pressure within that pipe 61 coming from the pump 40, escaping through the opening 76 of valve 62. Liquid passing through the valves returns to the reservoir 42, for reasons to be explained. Valves 59 and 62 are identical in operation, each having a stud radial crank 77 fixedly secured by a stud bolt 78 centrally axially of the rotatable valve core 75. As viewed in FIG. 5, the valves, 62 and 59, are each placed on the upper edges of the side plates 31, with their respective crank members 77 projecting slightly outwardly of the machine. Outwardly of the exterior plate 31, on that right side with the machine, on plate 31, I suitably pivotally mount a horizontally aligned pair of like dog leg arms 79 with one thereof substantially under each of those valves, for independent pivot connection from each. Each arm 79 is mounted to 31 by a conventional pivot at point 80. Midway of the rear pivot dog leg arm 79, I mount a horizontally extending idle-wheel glide-shoe 81, as illustrated, adapted to ride upon and along a fixed guide pipe 99; and midway of the front pivot dog leg arm 79, I similarly mount a similar idle-wheel glide-shoe 81a, projecting horizontally and outwardly therefrom. At the remote end of each dog leg 79, from its respective pivot, I pivotally connect one end of a rigid turn-buckle arm 82 and pivotally connect the other end of 82 with the outer end of the adjacent stub radial crank 77 from the rotatable core 75 of its respective valve, 62 above 80, and 59 above 81a. It will be seen that a pivotal raising or lowering of a dog leg arm 79 will cause a corresponding rotation of its thereabove adjacent valve core 75, of its respective one of valves 62 and 59, as the case may be. It will be observed that the valves on that right side of the machine are independently constructed and operable independently with relation to each other, for effecting an independent operation of the right rear or the front vertical ram-cylinders, 55 and 50, as the case may be.

The operation of the left rear vertical ram-cylinder 56, by its similarly internally constructed relief valve 72, to that of the valves 59 and 62, is by a different automatic operational method—namely, the valve 72 is operated by a novel pendulum arm 90. Valve 72 is similarly bolted with its outer cylindrical case fixedly secured in a horizontal position on the frame 30, as viewed in FIGS. 2 and 7. There is a similar radial stub crank 90 extending from and securely bolted by a similar stub bolt 78 to the axial center of its valve core 75. The rotatable inner core 75 is of the same type and construction as that of the other valves just explained, except 90 is a slightly longer radial arm for this valve, than the stub radial arm 77 of the other two valves, and at the end of the radial arm 90 I secure a weight, indicated as 91. It will thus be observed that the arm 90 will hang in pendulum like position and that the weight 91 will cause the core 75 of the valve to rotate as the result of the pendulum 90 gravity swinging, on the longitudinal horizontal axis of the rotatable core 75 within the outer sleeve 73 of the sleeve valve 72, on a tilting of the frame 30, as will be explained. It will be understood that the radial pendulum arm 90, of valve 72, is held by a stud screw bolt 92, not shown but similar to bolt 78 at the longitudinal axial center of the inner valve core 75 of valve 62.

Each of my similar inner constructed sleeve rotary operable release valves, 59, 62 and 72, explained, each have a conventional hydraulic seal neoprene ring 93, within its outer sleeve 73 and on the exterior on its inner core 75, at each end of the valve, in suitably formed grooves, for effecting a hydraulic seal to prevent liquid, passing or restricted by the valve, from escaping from the valve upon operation of the valve. I provide aligned peripheral grooves in each of those rotary valves, as indicated at 93a as the inner peripheral grooves formed inside the outer casing 73, and at 93b as the outer peripheral grooves formed in a corresponding position on the outside of the inner valve core 75, and with each of grooves 93a and 93b being positioned and adapted to receive the round endless neoprene ring 93 therein and therebetween in the assembly of the valve, as will be understood. Each valve 59, 62 and 72 has a similar neoprene ring seal construction just explained.

Figures 12, 13:
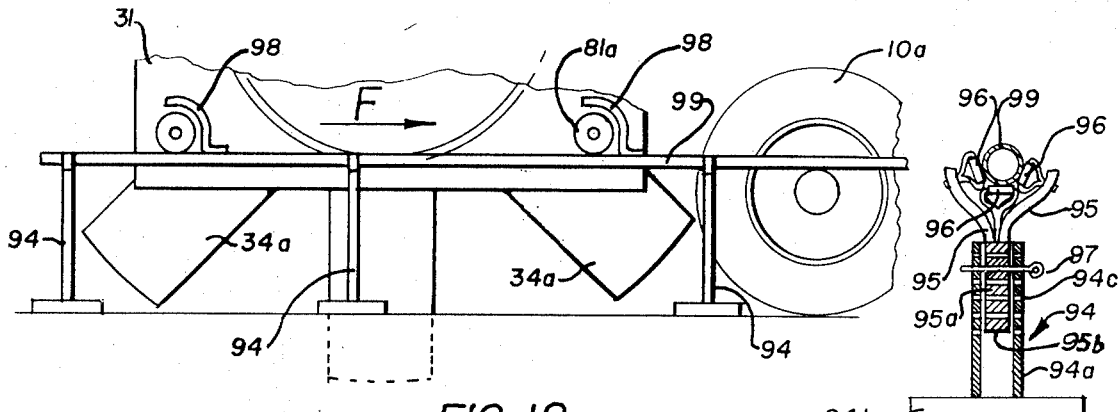
FIG. 12 is a partial enlarged diagrammatic view to illustrate the positioning of the straight guide pipe 99, resting on stationary ground stools 94, thereby to establish the desired pre-determined grade.
FIG. 13 is an enlarged partially vertical sectional view of one of my stools 94.

In the operation of my novel digger machine, as first explained, the field to be irrigated is usually first levelled or graded to the desired needed suitable so-called slightly straight line down-hill grade. Also, the grade at which the desired side irrigation ditch for the field, desired to be dug, likewise is first pre-determined, in terms of the amount of fall to be had when the ditch is formed, commensurate with the length thereof along the field. When that latter desired fall line or grade is so ascertained, I then mount a straight round rigid guide pipe 99, equal to or in alignment with that desired line of fall or grade for the new ditch, by resting that guide pipe upon manually placeable stool members 94, each resting on the ground at intervals with the guide pipe resting thereon and therebetween. Each stool has a base, 94b, and an upright rigid tubular post, 94a, extending upwardly therefrom. The post 94a has a plurality of diametrically opposed holes, 94c, extending horizontally therethrough. I provide a wish-bone type or Y extension member 95, with a lower central round leg 95b attached to be slideably downwardly inserted into the upper open end of base post 94a, for vertical positioning at any desired height thereof in and to be held by that base. Similarly spaced horizontally aligned diametrically opposed holes 95a are former in the lower leg 95b, and a removeable cotter-key or bolt 97 is manually insertable within an aligned horizontal hole 94c, of the base post 94a, and through holes 95a of the down leg of the upper Y member within the post, to hold the two together at any desired height position adjustment of the leg within the post, as shown in FIG. 13. As will be explained, the guide pipe 99 rests within the upper notch of the wishbone member 95, and is periodically pulled horizontally along and on those wish-bone members 95 of the stools 94. To facilitate such movement of the pipe 99, along and on the wish-bone upper portion 95 of the stools 94, I provide a suitable plurality of rollers 96, each suitably journalled in a crescent arrangement to each other within the notch of the wish-bone member 95, so as to permit the pipe to rest on the peripheries thereof and to run thereover upon a longitudinal pulling of the pipe thereover. As my machine moves forwardly, in the direction indicated as F in FIG. 12, I find it convenient to have the pipe 99 pulled forwardly on the stools 94 by the machine, by suitable crescent hooks 98, each extending outwardly from the outer side plate 31 of the machine, and each adapted to abut against a glide-shoe 81 or 81a, whereby, as the machine moves to the right or forwardly as there viewed, the crescent hooks 98 will become in abutment against 81 and 81a and in turn the machine forward movement will cause the pipe to be moved forwardly with it by those hooks.

Figure 11:
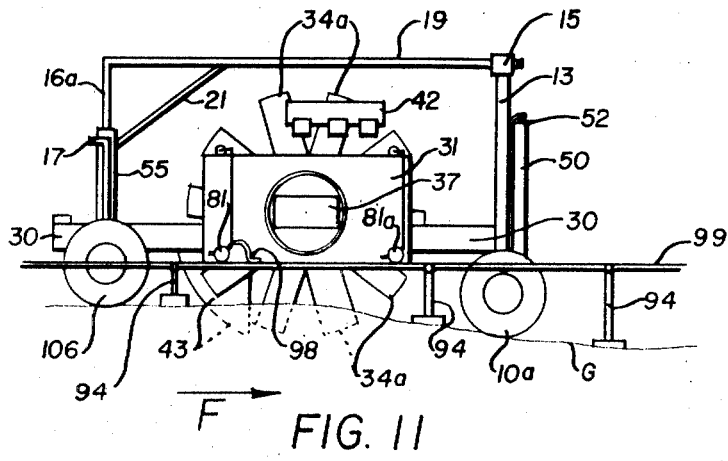
FIG. 11 is a reduced diagrammatical view illustrative of the operation of my digger machine in the direction F and showing the riding of the wheels over uneven ground from front to back.

It will be understood that the desired grade for the ditch to be newly formed is pre-determined and the stools 94 are each first so set manually on the ground, on the right side of the machine, with the height rollers 96, in 95 of each stool 94, being of an amount sufficient with relation to the grade of the ground for the pipe 99 resting on said rollers of the stools 94 to be exactly at that desired new grade line for that new ditch to be formed by the machine, as illustrated in FIGS. 11 and 12. The three stools 94 are set by hand on the ground about 10 feet apart. As pipe 99 is pulled forwardly off the rear one of stools 94, that one stool is then taken forwardly into aligned position to continue receiving 99 thereon in the desired pre-determined grade line prolongation of 99.

While I have shown and explained, for simplicity of explanation, in FIG. 8, three separate hydraulic pumps, in order to clearly explain the individual hydraulic operation of each of my novel in affect three point pivotally suspended vertical hydraulic ram-cylinders, it is to be understood that there could be only one hydraulic pump suitably connected to operate the needed pressure to each of the three individually operable ram-cylinder chambers, through suitable needed pressure outlet valves leading from such a single pump in the line to each of said hydraulic ram-cylinders. However, the use of an individual pressure release valve, in the line of the hydraulic pressure from the pump source of hydraulic pressure to each hydraulic cylinder, is an important part of my invention, as may be concluded from the detailed description and from the following further explanation of the further operation of my machine.

Figure 14:
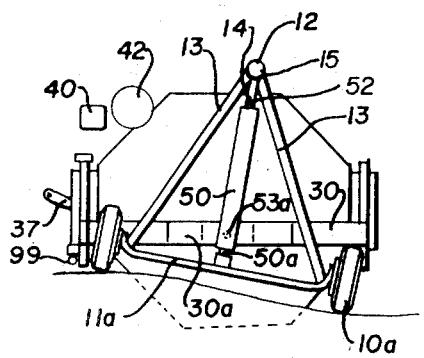
FIG. 14 is a reduced diagrammatical front end view of my machine, illustrative of the relative pivotal side rocking of the front end of the chassis on pivot 53a as the machine goes over a slope or over uneven ground.

As viewed in FIG. 6, increased hydraulic pressure, through the pipe line, 57, into the interior of the front hydraulic ram-cylinder 50, will cause the piston 50b of that cylinder to be expanded or moved away from the interior of the closed end of that cylinder, and since the piston rod 50a is fixed, through 54 to the axle 11a, the piston cannot move, so, as a result, the cylinder 50a is telescopically raised by that interior hydraulic pressure and the frame 30 and 30a is thereby raised along with the cylinder 50—since 50 is connected through 52 and 53 at 53a to that frame 30—thus effecting a raising of the front of the digger unit by that front end 8 the frame 30, and thereby raising the paddle wheel unit 34 of the digger will be proportionately effected out of the ground. Conversely, the reduction of the pressure within 50 will obviously permit a fall of the front of the frame 30 and its digger unit 34 into the ground and with relation to the front axle 11a. By the pivoting of the front axle end of the cage frame 12, explained heretofore, at the front pivot point 53a, upon the front wheels riding over substantially hilly ground, as in FIG. 14, that front inverted V wedge support of the cage frame pivots laterally on the pivot 53a, as shown, without disturbing the horizontal substantially level positioning and carrying of the digger unit frame 30, since the upper apex collar 15 connects that front apex support to 19 as a loose joint pivot connection. The telescopic raising or lowering of the front cylinder 50, just explained, with relation to its piston 50b, will be understood as controlled by the hydraulic pressure within that ram-cylinder and which pressure in turn is controlled by its automatically operable pressure release valve 59, as explained. The lateral rockable ability of the front end of the frame on the pivot 53a is in no way caused by nor hindered by such raising or lowering of the front end of the digger unit just explained.

Figure 15:
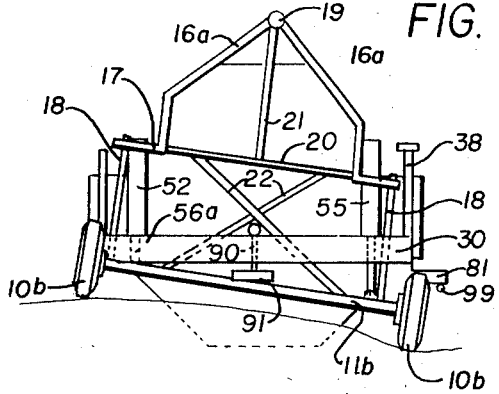
FIG. 15 is a reduced diagrammatical rear end illustration of the operational pivotal movement of the rear of the chassis of my machine over certain other uneven sideways ground with relation to the direction of travel of the machine.

Increased hydraulic pressure within the right rear vertical ram-cylinder 55 chamber, from its pump 40, and within and between the head of that cylinder and its piston 55a, will similarly cause an expansion movement to occur between that inner cylinder head and that piston 55a, and since the piston 55a through its rod 55b is unmoveable, in the direction against its pivot connection 55c on the axle 11b, then the cylinder 55 will be thereby caused to be raised with relation to its piston 55b and thus there will be a raising by the cylinder 55 of the right rear portion of the digger unit frame 30, since the exterior of the cylinder 55 is secured to that frame 30, as illustrated in FIG. 15, for maintaining an automatic level condition of the right rear of the frame 30 during the digging operation on the right rear wheel being depressed, as there shown. The expansible operation of either of said front vertical ram-cylinder 50 or right rear cylinder 55 is caused independently of each other by their respective release valves, 59 and 62 and which valves are independently operable and of similar operational construction, as shown in FIG. 5, during the operation of my machine or to the right as there illustrated. As explained, the pivoted glide control shoes 81 and 81a riding upon the fixed guide pipe line 99, control the rotational position of their respective relief valves 62 and 59.

In the commencement of the digging operation of the desired new ditch, after the digger unit is positioned so that the lower extremities of the rotating radial paddle digger arms, 34a of the paddle wheel 34, extend to the desired depths within the ground for the formation thereby of the newly desired ditch grade or depth, and after the new grade line pipe 99, explained, is set and as determined by the fixed guide pipe 99, the manually rotatable turn-buckle 100, provided in the connecting pivot link arm 82, between each dog leg 79 and the corresponding radial crank 77 of its thereabove valve, is so positioned on 82 to determine the needed length of that connecting arm 82, with its respective glide shoe 81 or 81a as the case may be, resting upon said pipe 99, so as thereby to position the valve radial crank 77 in such a radial position as to axially cause the desired rotation of the respective inner valve rotatable core 75 as to cause an opening of that release valve, as illustrated in FIG. 9, to thereby permit only a portion of the pressurized pumped liquid in the inlet or upper pipe line 61, as there illustrated, to pass through the opening 76 of the valve to the outlet or lower opening 61 thereof for an escape of that liquid back to the reservoir. In other words, a proper rotation of valve core 75 controls the retention of sufficient hydraulic pressure in line 60, from passing through the automatically operable pressure relief release valve 62, as indicated in FIG. 8. A combination of sufficient pressure going from pump 40 into the main pipe line 60, and into the chamber portion of the hydraulic ram-cylinder 55, is necessary to maintain the normal desired elevational position of the right rear portion of frame 30, by cylinder 55, with relation to the bottom of the new ditch being dug by the lower extremities of the rotating paddle wheel blades 34a. A proper presetting of core 75 is made by adjustment of turn-buckle 100 to cause a length adjustment of link arm 82 on lowering of the digger unit into the ground into operative position, and with 81 riding on 99, to thereby set the needed positioning of the valve core 75, just explained. Similarly, in the start of the digging operation, a similar adjustment is made with relation to the frame glide shoe 81a and its connecting pivot arm 82 by its turn-buckle, 100, for effecting a setting of the rotational valve core 75 of the front valve 59, for controlling a similar needed amount of hydraulic pressure being maintained in pipe 57 and in the inner chamber of the front ram-cylinder 50, by only permitting a portion of that pressure to escape back through that valve into the reservoir 42, for effecting a normal holding by the ram-cylinder 50 of the front end of the frame 30 of the digger machine during digger operation.

Pressure relief valves 59, 62 and 72 are each set in such a pre-determined relationship position, of the core opening 76 of the inner rotatable core 75 of each, with relation to the inlet and outlet main pressure pipes of each valve, to permit passage of the right amount of pumped fluid through the main pressure pipe to the interior of the vertical ram-cylinders, to which each main fluid pipe is connected, so as to normally position or hold the frame 30 of the digger unit in a horizontal level position during digging operation.

Such initial rotational setting adjustment of each inner valve core 75 thereof is made, so that each valve permits such sufficient hydraulic pressure to be maintained in its respective ram-cylinder chamber to thereby hold the digger machine unit frame 30 at such desired horizontal level and depth positions at all times as the machine is operated. The three vertical ram-cylinder casings are each secured to the digger unit frame 30, and the respective piston rods of each are in turn secured to their respective adjacent chassis unit axle—or with one hydraulic ram unit, 50, piston rod to the front axle, at the front of the digger unit frame; and with two of the other piston rods of the ram-cylinders, 55 and 56, secured to an outer end of the rear axle. The hydraulic pressure within each vertical ram-cylinder chamber effects the amount of vertical holding, raising or lowering of that part of the digger unit 30 frame, with relation to the respective axles of the cage-chassis, as explained. During the digging operation forward movement of the machine, as shown in FIG. 1 and by F of FIG. 11, sufficient hydraulic fluid pressure is maintained within the upper internal chamber portions of each vertical ram-cylinder 50, 55 and 56 to maintain the desired horizontal holding thereby of the digger unit frame 30. The hydraulic pressure generated by each identical and like-operated hydraulic pump is of combined pressure in excess of that caused by the weight of the digger unit 34, or is sufficient to cause a complete inner expansion between the respective inner cylinder heads of each hydraulic ram-cylinder 50, 55 and 56, and its respective piston, or to cause a complete raising of the digger unit out of the ground; and so, I, therefore, provide my novel operable pressure relief or release rotary sleeve valves, 59, 62, and 72, to permit the unneeded excess portion of the hydraulic pressure in the respective hydraulic main pressure pipe line of each to escape back to the reservoir 42, as may not be needed for the proper level holding by the ram-cylinders of the frame of the digger unit. Each of said valves is in a pressure escape pipe line extending from the cylinder's main pressure pipe line and back to the reservoir. In FIG. 9, I illustrate an enlarged vertical cross section of one of my novel relief valves. It will be seen, in that position there illustrated of the central rotatable valve core 75, that only a portion of the hydraulic pressure is being thereby permitted to pass through the inner valve core opening 76, to be returned to the reservoir 42, as indicated by the arrows in the pipe lines; and that a clockwise rotation of the core 75 by the crank 77, from the position of 75 shown, would cause more liquid to escape through 76 and back to the reservoir; and that a counterclockwise rotation of that core 75 would thereby effect more of a closing of the pressure release hole 76 through 75 and thereby seal off and prevent any return pressure or escape of liquid in direction of arrows through the valve to the reservoir 42. A prevention of such liquid escape back to the reservoir 42 will hold the pressure in the main pipe line 60, for example with reference to valve 62, and thereby cause that pressure to expansibly operate the piston 55a, with relation to the inner end of the cylinder 55, in affect, by thereby causing a complete raising of the right rear corner of the digger unit frame by that cylinder casing 55, since 55 is secured to the digger unit frame.

Upon digger unit 34 operation, and a holding of its frame 30 horizontally level by the three vertical ram-cylinders, after the pre-setting of each valve core 75 and its arm, as explained, each relief valve 59, 62, and 72 permits the needed amount of fluid to escape therethrough back to the reservoir to effect maintenance of the needed pressure in each ram-cylinder head so as to hold frame 30 level, by a normally rotational holding of each of the valve inner cores 75, substantially in the positions illustrated in figures 9 and 16. The original setting of the valves 59 and 62, is by the positional setting of the inner cores 75 of each substantially as illustrated in FIG. 9.

Upon operation, as the right rear wheel of the chassis unit 12 rides over a ground bump, that bump caused wheel 10b raising, through 11b, 55c, 55b, and 55a and the liquid held within 55 will cause a momentary raising of the right rear corner of the frame unit, 30, and, viewing the valve 62 as illustrated in FIG. 9, would then in effect cause a clockwise momentary rotation of the inner valve core 75, with relation to its casing 73, thereby then momentarily aligning the escape port 76, within 75, with the outlet or lower pipe 61, thus opening the valve and allowing more fluid pressure to by-pass through that valve and thereby instantly relieving the fluid pressure within the head of the ram-cylinder 55 and in the main pipe line 61; and that lesser pressure in that cylinder 55 chamber then permits the digger unit to fall of its weight by a movement of the cylinder 55 telescopically on and over its piston 55a, thus effecting a momentary digger frame automatic self-levelling, thereby thus causing a reverse or counterclockwise rotation of the inner valve core 75 in 73 and thus effecting a return to the restricted port 76 relationship illustrated in FIG. 9, then and thereafter, as before said wheel rise, to thereby hold the required pressure within 55a to maintain the desired horizontal position of the frame 30 by 55 again. In the operation of the valve just explained, upon the raising of the right rear wheel 10b, it will be seen that core 75, by its radial crank arm 77 of the valve, through pivot members 82, 100 and 79, is rotated clockwise, as viewed in FIG. 9, by the contraction spring 101 keeping glide-shoe 81 on pipe 99, during such wheel raising. In the wheel raising operation just explained, glide shoe 81 is normally held down on the guide pipe 99 by contraction spring 101. Thus, upon hydraulic fluid release from the interior of hydraulic cylinder 55, the frame 30 right rear corner point, of the three point suspension of that digger unit frame 30, secured to the exterior of that cylinder 55 casing portion, will fall by the weight of the unit; and upon an increase of the hydraulic pressure in the ram-cylinder sufficient to exceed the proportionate weight of the digger unit, held by that ram-cylinder at that unit suspension point, then the digger unit frame will be raised at that point by the closed cylinder portion of that ram-cylinder expanding, with relation to its internal piston, and since the rod of the piston is fixed at its lower end to and on the chassis axle. A similar operation of front cylinder 50 by its valve 59 and its glide-shoe 81a, and spring 101a, effecting an automatic raising and lowering of the front portion of frame 30 suspension point 53a, will be understood as similar to the operation of cylinder 55 just explained, upon the right front wheel going over uneven ground.

It is to be understood that I use a similar internally constructed pressure relief valve, indicated as 72, for the left rear vertical ram-cylinder 56, operatively in affect pivotally holding the left rear corner of the digger unit frame 30 with relation to that side of the rear axle, but I operate the core 75 of that pressure relief valve 72 by a novel pendulum gravity actuated radial rocker arm 90 automatically affecting the core 75 rotation of that rotatable relief valve 72, shown in FIGS. 7, 8 and 16. The valve 72 is of identical internal construction to the other valves 59 and 62, but without the radial stub arm 77. Instead of the radial stub arm 77, I provide a radial elongated weighted pendulum arm 90 axially secured fixedly to its core 75, as explained, with the pendulum weight indicated as 91 at the outer extremity. The tubular casing 73 of the valve 72 is horizontally fixedly positioned on 30. The radial arm 90 is axially of core 75 secured at its upper end fixedly by the removable stud screw 92 secured to the longitudinal axial center of the core 75 of that valve, similarly to the screw 78 securing stub 77 of the other two valves, so that the core 75 is freely rotatable in 73 to permit the radial arm 90 to swing as a pendulum by core 75 as its pivot. In the initial start of operation of the digging of any desired depth irrigation ditch, it will be seen that there also has to be sufficent liquid pressure in the left rear vertical ram-cylinder 56 to cause a positioning of its piston 56b with relation to the interior head of that ram-cylinder, so as to have that liquid pressure therein effecting a holding of that corner of the frame, through that cylinder 50, in a horizontally level position sideways of the machine. My novel pendulum gravity-operable valve 72 pendulum control arm 90 will automatically control the hydraulic pressure within the chamber of the ram-cylinder 56, to have sufficient pressure to thereby hold the frame 30 adjacent corner, with reference to the rear axle at that left rear of the machine, and also thereby to hold the left rear corner of that digger unit frame 30 in a horizontally level position, as the left rear wheel might rise or fall over the surface of the ground. The operation of that valve 72 core 75, by the pendulum arm 90, to accomplish that level holding of the frame 30 at that corner upon a raising or lowering of the left rear wheel 10b, will be understood by a reference to the foregoing detailed explanation of the similar operation of the valve core 75, on the raising or lowering of the right rear wheel, as the valve operation is similar, except that it is actuated by a swinging of the pendulum arm 90. In this valve 72, pendulum arm 90 is manually fixedly pre-set on its core 75, in the first instances of starting of the digger machine operation, by its stud screw 92 being loosened with relation to the rotatable core 75, and the radial arm 90 then loosely hung vertically by gravity therefrom and with the core 75 rotated within its valve sleeve 73, substantially as shown in FIG. 16 with its inner relief opening 76 positioned to be only partially aligned with pipes 71 to permit only a portion of the pressure coming through the line 71 to pass through that inner valve core opening 76, and then the radial pendulum arm 90 is fixedly seated axially to 75 by the screw 92 fixedly being seated into core 75 and to the arm 90 in a gravity vertical position of 90, thereby assuring a supply of sufficient needed amount of hydraulic pressure within the cylinder chamber of the ram-cylinder 56 for that pressure within that chamber to hold the cylinder casing of 56 expanded from its inner piston 56a sufficiently that the adjacent corner of that frame unit at 30 is horizontally lifted and initially held by that 56 casing. Though not fully illustrated, it will be understood, in viewing FIG. 7, how the pendulum controlled left rear cylinder 56, relief valve 72 operates, as will now be briefly explained: upon the operation of the digger machine, should the left rear wheel ride over a depression in the ground so that said wheel falls, that obviously will cause that pendulum arm 90 by its weight 91 to pendulumly swing by gravity to the left as there viewed. FIG. 16 illustrates the normal setting of the valve core 75 of valve 72 in its outer cylindrical casing 73, with relation to hydraulic release pipe 71, namely, in normal operation it is set so that only a portion of the fluid by-passes therethrough back to the reservoir. Thus upon a lowering of the left rear wheel there is a momentary dropping of that corner of the machine, which as explained, causes pendulum 90 to swing to the left, as illustrated in FIG. 7, which will then be seen, in FIG. 16, to effect a clockwise rotation of core 75 and thereby a momentary closing of that release valve 72, which will then increase the fluid pressure in the head of the ram-cylinder 56 and which increased pressure will then cause the piston 56a in effect to be moved from the cylinder head with relation to that cylinder head; but since that piston cannot move the cylinder head is raised by that increased pressure, and then momentarily upon that raising a counter-clockwise rotation of the valve core 75, or return to its normal operative position, illustrated in FIG. 16, occurs, by the pendulum arm 90 swinging to the right for continued maintenance again within the chamber of 56 of a supply of only the needed hydraulic pressure to hold that corner of the digger unit in horizontal level position, as before that left rear wheel going over that depression. My novel automatic pendulum operated hydraulic pressure relief sleeve rotary valve 72 is in co-operation with the left rear vertical ram-cylinder 56, for effecting an automatic self levelling of that corner of the digger frame of my machine thus assisting in the overall frame self-levelling. Before a stopping of the hydraulic pumps 39, 40, and 41, I shut manual valves 57a, 60a and 70a, so as, on stop of operation of the machine, to assure a retention of the then hydraulic pressure in each ram-cylinder 50, 55 and 56, to thereby hold the ditcher frame level without reference to the chassis frame 12, during inoperation of the machine, and on resuming operation of the machine after start of the pumps then those valves 57a are manually re-opened.

It will thus be seen that a ditch formed by my novel self-levelling paddle wheel ditcher machine, constructed and operated as explained, will be a straight line uniform grade ditch throughout its thereby dug length, and also plumb from side to side. My novel combination of a three point hydraulic vertical independently operable ram-cylinder pivotal suspension of the digger unit within and to the cage-chassis frame, with my novel automatically operable pressure release valves controlling the hydraulic pressure in each ram-cylinder for effecting an automatic self-levelling of the digger unit for thereby digging a uniform grade ditch during operation of the machine, produces, for the first time, so far as known, an automatically operable self-levelling irrigation ditcher machine, using two types of such valves; one lever operated in combination with a fixed guide pipe line, and the other a novel pendulum lever automatically gravity operable.

What I claim and desire to secure by Letters Patent is:

1. A paddle-wheel-digger ditcher machine comprising:
 (A) a cage-chassis frame unit having front and rear axles and a pair of wheels on each axle;
 (B) a digger-unit having a horizontal frame pivotally attached to and carried by the chassis at three suspension points, a rotatable digger paddle wheel pivotally carried within the digger unit frame, said paddle wheel having a hollow transverse partial drum-like axle horizontally journalled to the digger unit frame, an endless dirt conveyor belt operatively extending through said paddle wheel axle, and power means for effecting a rotation of said paddle wheel in direction down and forwardly toward the direction of forward movement of the machine;
 (C) a plurality of hydraulic ram-cylinder means each vertically positioned to effect one of said three suspension points between said digger unit frame and chassis frame, for thereby effecting a raising or lowering of the digger unit independently at each of said suspension points, with each of said ram-cylinder means having a hydraulic cylinder, a plunger operable piston therein, and a piston rod extending from the piston, and with one of either the cylinder or its piston rod of each of the ram-cylinders being fixedly secured to the digger unit frame, and with the other of the cylinder or its piston rod being pivotally secured to and carried by an axle of the chassis frame;
 (D) an identical hydraulic liquid power system means carried by the digger unit frame for supplying hydraulic pressure within the internal chamber of each of two of said hydraulic ram-cylinders, including:
  (a) A hydraulic reservoir on the digger unit frame;
  (b) a hydraulic pump for pumping liquid from the reservoir under pressure;
  (c) a main hydraulic pipe line to transmit liquid from the reservoir to the internal chamber of of said two of the ram-cylinders and with said pump being in said pipe line, and having a hydraulic pipe line off-set extension between the main pipe line and the reservoir;
  (d) a rotatably operable pressure control release valve having a rotatable valve core and a radial crank secured to said core for effecting valve rotational operation and extending from said core, with said valve being positioned in the hydraulic pipe line off-set extension;
  (e) said pump creating more than sufficient hydraulic pressure in said main pipe line to expand the piston within the ram-cylinder sufficiently against the weight of that portion of the digger unit frame to cause a horizontal holding positioning of that portion thereby, said release valve being adapted to have its radial crank pre-set to permit a portion of that hydraulic pressure from the pump to return to the reservoir during normal horizontal holding of the frame by the ram-cylinder;
  (f) a pivotally mounted and operable glide-shoe lever means extending outwardly from the digger unit frame and rideable upon a fixed predetermined grade guide pipe-line positioned on the ground externally of the machine; and
  (g) an adjustable length pivoted connecting rod means extending between the pivotal glide-shoe lever means and the radial crank of said valve means;
 (E) a hydraulic power system means carried by said digger unit frame connected for supplying hydraulic liquid power to a third one of said ram-cylinders, including:
  (a) a hydraulic reservoir on the digger unit frame;
  (b) a hydraulic pump for pumping liquid from the reservoir under pressure;
  (c) a main pipe line to transmit liquid from the reservoir to the internal chamber of said third ram-cylinder and with said pump being in said pipe line, and having a hydraulic pipe line off-set extension between the main pipe line and the reservoir;
  (d) a rotatably operable pressure-control hydraulic release valve having a rotatable valve core and a radial pendulum crank secured to and extending axially from the core, with said valve being positioned in the hydraulic pipe line off-set extension;
  (e) said pump creating more than sufficient hydraulic pressure to expand the piston within the ram-cylinder sufficiently against the weight of that portion of the digger unit frame to cause a horizontal holding positioning thereof thereby, and said release valve being adapted to have its radial crank pre-set to said core to thereby permit a portion of that hydraulic pressure from the pump to return to the reservoir during normal horizontal holding of the frame by the ram-cylinder; and
  (f) said release valve rotatable core pendulum crank having a weight secured to the end thereof for gravity pendulum operation of the rotatable valve core thereby upon any elevational unlevelling movement of the digger unit frame, said rotatable core portion of said valve being freely rotatable by said gravity pendulum crank and being adapted to be pre-set with relation to gravity positioning of said crank to normally permit only a portion of the liquid pressure from the pump to pass through the valve and return to the reservoir when that portion of the digger unit frame is in horizontal position and for the remainder of the liquid pressure then to by-pass the valve and to pass to the chamber of said third one of said ram-cylinders upon a vertical gravity hanging of the pendulum arm.

2. A forward moving straight earth line ditch forming machine comprising:
 (A) a chassis frame having a front wheel and rear wheel and each wheel having an axle,
 (B) a ditch forming unit having a frame suspended within and carried by the chassis frame at front and rear pivot points,
 (C) a vertically positioned pair of independently operable hydraulic ram-cylinders, each adapted to have hydraulic pressure therein only above the piston thereof in proportion to the weight of the frame carried thereby, with one positioned so to secure the unit frame to the axle of the front wheel, and the other positioned so to secure the unit frame to the axle of the rear wheel, with a portion of each ram-cylinder being fixedly secured to either the unit frame or the axle, and with another portion of each ram-cylinder being pivoted to either said frame or its adjacent axle, for so pivotally suspending the unit frame within and effecting its carrying by the chassis frame,
 (D) a variable hydraulic pressure system for automatically depth adjustably carrying the unit frame by each of said operable hydraulic ram-cylinders upon a raising or lowering movement of either of said wheels and for effecting an automatic horizontal leveling of the frame of the unit upon a vertical wheel movement during operation of the machine, comprising:

(a) a reservoir on the unit frame,
(b) a main hydraulic pipe line extending from the reservoir to the internal chamber portion of a ram-cylinder above its piston,
(c) a rotatably operable hydraulic release sleeve valve having a rotatable core, a release pipe line extending between the main pipe line and the reservoir and a radial crank arm extending from the core for operating the valve core and being positioned in the release pipe line to transmit any pressure released through the valve back to the reservoir, said valve being adapted for pre-setting to control the amount of liquid released therethrough and escaping back to the reservoir,
(d) a fixed rigid guide pipe pre-set upon the desired earth grade line to be formed by the machine and resting on the ground alongside of the machine,
(e) pivotal glide lever arm means on the exterior of the unit frame adapted to ride upon the fixed guide pipe line and being pivotally secured to said unit frame exterior and above said guide pipe line and having a glide-shoe secured remote from its pivot connection to the unit frame, tension means adapted to normally cause the shoe to ride toward and upon said glide-guide pipe line, and
(f) an adjustable length rigid connecting pivot arm pivotally secured to and extending between each of the ends of said valve radial crank and said glide lever arm.

3. In combination with a forward moving ditch forming machine, having a horizontal towable frame chassis having two wheels, an axle for one wheel, and a vertically positioned hydraulic expansion ram-cylinder means, having a cylinder, a piston operable therein and a piston rod extending therefrom, and with the ram-cylinder means pivotally connected by either of its cylinder or piston rod to said axle adjacent its wheel, and the other of either said cylinder or piston rod being fixedly secured to the frame, the combination therewith of a hydraulic pressure system for operating said ram-cylinder by such pressure above the piston thereof in proportion to the weight of the digger unit carried by the ram-cylinder means, comprising: a reservoir on the frame, operable hydraulic pressure pump on the frame and operated by a suitable source of power from the tractor pulling the machine, a main hydraulic pipe line extending from the reservoir to the internal chamber of the ram-cylinder, the pump being positioned in that main pipe line, a relief pipe line extending between the main pipe line and the reservoir, and operable rotatable sleeve pressure release valve having a rotatable portion and positioned in said relief pipe line for normally controlling the hydraulic pressure in the ram-cylinder chamber, said rotatable valve being normally held to the frame with its rotatable portion being freely rotatable and in a horizontal position and having a pendulum crank arm hanging radially downwardly therefrom, said arm being adjustably fixedly secured to said horizontal rotatable portion of said sleeve valve and having a weighted end thereof remote from said rotatable portion and being adapted for effecting a gravity pendulum operation of the rotatable valve portion upon any tilting movement of the frame from the horizontal, the rotatable portion of the valve being adapted upon rotation to open or close the valve upon a certain presetting fixed adjustment of the pendulum arm thereto, whereby said pendulum arm gravity actuated rotational movement of the valve rotatable portion comprises automatic means for controlling the amount of hydraulic liquid passing through the valve from the pump into the relief by-pass pipe back into the reservoir upon any such frame unlevel slant or tilting movement thereof, by the ram-cylinder means:

4. In a machine adapted to form a straight line earth ditch surface, as its earth forming portion is held depressed and it is moved forwardly, having a horizontal frame, and adjacent horizontal axle and a wheel on the axle for carrying the frame, the combination therewith of an operable hydraulic vertical ram-cylinder connecting said frame to said axle and having a cylinder and an operable piston therein and a piston rod extending therefrom, one part of the ram-cylinder being fixed to the frame and another part thereof pivotally secured to the axle, a reservoir source of hydraulic liquid on the frame, one hydraulic pipe line extending from the liquid reservoir to the interior of the ram-cylinder above its piston, a hydraulic pressure pump in the main pipe line, a main hydraulic pressure release pipe line extending from the main pressure pipe line back to the liquid source reservoir, a pressure release pipe line extending between the main pipe line and the reservoir, an operable pressure release valve having an operable crank for opening it and being positioned in the pressure release pipe line, automatic valve operable means including a fixed rigid pipe-guide-line member resting on the ground alongside the machine, a pivoted glide shoe mounted on the frame and adapted to pivotally ride upon said pipe-guide-line member, tension means on the frame normally urging the glide-shoe toward the guide-line-pipe, and an adjustable-length connecting pivot rod extending between the ends of the pivotal glide shoe and the valve crank, whereby a raising or lowering of the frame upon a raising or lowering of the wheel will automatically cause operation of the valve crank by the glide shoe riding on the guide line pipe for thereby varying the liquid pressure in the ram-cylinder for in turn effecting the vertical positional holding of the frame by the ram-cylinder.

References Cited
UNITED STATES PATENTS

| | | | |
|---|---|---|---|
| 354,136 | 12/1886 | Henderson | 37—93 |
| 2,621,427 | 12/1952 | Hulse | 37—97 |
| 2,684,254 | 7/1954 | Goss | 280—112 |
| 2,755,721 | 7/1956 | Rusconi | 174—4 |
| 2,844,882 | 7/1958 | Earley et al. | 33—185 |
| 2,872,200 | 2/1959 | Kroll | 280—6 |
| 3,044,194 | 7/1962 | Balkheimer | 37—86 |
| 3,156,989 | 11/1964 | Atkinson | 172—4 XR |
| 3,346,976 | 10/1967 | Curlett at al. | 172—4.5 |

ROBERT E. PULFREY, Primary Examiner

C. D. CROWDER, Assistant Examiner

U.S. Cl. X.R.

91—47. 414: 172—4.5: 280—6.1

UNITED STATES PATENT OFFICE
CERTIFICATE OF CORRECTION

Patent No. 3,516,182

June 23, 1970

Jeffie I. Wykert

It is certified that error appears in the above identified patent and that said Letters Patent are hereby corrected as shown below:

Column 4, line 30, cancel "vide". Column 6, line 72, "conection" should read -- connections --. Column 9, line 27, "former" should read -- formed --. Column 12, line 75, before "73" insert -- its --. Column 15, line 48, at the end of the line insert -- one --. Column 18, lines 30 and 31, cancel "a pressure release pipe line extending between the main pipe line and the reservoir,".

Signed and sealed this 16th day of February 1971.

(SEAL)
Attest:

EDWARD M. FLETCHER, JR.
Attesting Officer

WILLIAM E. SCHUYLER, JR.
Commissioner of Patents